US009784609B2

(12) United States Patent
Strackerjan et al.

(10) Patent No.: US 9,784,609 B2
(45) Date of Patent: Oct. 10, 2017

(54) DEVICE FOR MEASURING A FILLING LEVEL OF A LIQUID IN A CONTAINER WITH AN ULTRASOUND SENSOR

(71) Applicant: Hella KGaA Hueck & Co., Lippstadt (DE)

(72) Inventors: Falko Strackerjan, Achim (DE); Sergej Tonewizki, Diepholz (DE); Ingo Zoyke, Stuhr Moordeich (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 53 days.

(21) Appl. No.: 14/752,220

(22) Filed: Jun. 26, 2015

(65) Prior Publication Data

US 2015/0377684 A1 Dec. 31, 2015

(30) Foreign Application Priority Data

Jun. 27, 2014 (DE) .......................... 10 2014 009 543

(51) Int. Cl.
*G01F 23/296* (2006.01)

(52) U.S. Cl.
CPC ........ *G01F 23/2962* (2013.01); *G01F 23/296* (2013.01); *G01F 23/2968* (2013.01)

(58) Field of Classification Search
CPC . G01F 23/2962; G01F 23/296; G01F 23/2968
USPC ...................................................... 73/290 V
See application file for complete search history.

(56) References Cited

U.S. PATENT DOCUMENTS

| 5,456,108 | A | * | 10/1995 | Birkett | ................ | G01F 23/2962 |
| | | | | | | 73/290 V |
| 7,069,781 | B2 | * | 7/2006 | Nelson | ................. | G01D 11/245 |
| | | | | | | 73/431 |
| 2009/0301187 | A1 | * | 12/2009 | Beyer | .................. | G01F 23/296 |
| | | | | | | 73/290 V |
| 2011/0228641 | A1 | * | 9/2011 | Niemann | ............ | G01F 23/2962 |
| | | | | | | 367/99 |
| 2014/0338444 | A1 | * | 11/2014 | Jaeger | ................ | G01F 23/2962 |
| | | | | | | 73/290 V |

FOREIGN PATENT DOCUMENTS

| DE | | 69422002 | | 7/2000 | | |
| DE | EP | 2133670 | A1 * | 12/2009 | ......... | G01F 23/2962 |

(Continued)

*Primary Examiner* — Hezron E Williams
*Assistant Examiner* — Marrit Eyassu
(74) *Attorney, Agent, or Firm* — Muncy, Geissler, Olds & Lowe, P.C.

(57) ABSTRACT

A device for measuring the filling level of a liquid in a container is provided, which uses an ultrasound sensor. The ultrasound sensor is associated with a damping cup with at least one antechamber, and the antechamber has at least one outer ring and one inner ring. The inner ring is arranged within the outer ring and the ceiling of the inner ring has different heights. The ceiling has a lowest point and a highest point. In the area of the ceiling the inner ring is provided with a venting connection with the outer ring. The venting connection between the inner ring and the outer ring is located at the highest point of the inner ring. The ceiling of the outer ring has different heights including a lowest point and a highest point. A vent hole is provided at the highest point of the outer ring.

7 Claims, 7 Drawing Sheets

(56) References Cited

FOREIGN PATENT DOCUMENTS

| EP | 0653611 A1 | 5/1995 |
| EP | 2366984 | 9/2011 |
| WO | WO 2008009277 | 1/2008 |

\* cited by examiner

DEVICE FOR MEASURING A FILLING LEVEL OF A LIQUID IN A CONTAINER WITH AN ULTRASOUND SENSOR

BACKGROUND OF THE INVENTION

Field of the Invention

The invention relates to a device for measuring a filling level of a liquid in a container with an ultrasound sensor, wherein the ultrasound sensor is associated with a damping cup with at least one antechamber, wherein the antechamber comprises at least one outer ring and one inner ring, wherein the inner ring is arranged within the outer ring.

Brief Summary of the Related Art

A generic device for measuring a filling level of a liquid in a container is known from the WO 2008/009277 A1. The container concerned is, in particular, a container for holding engine oil. The oil level in engines is ascertained using ultrasound sensors. These emit sound waves, which reflect at the boundary surface between two media, in this case between gas and oil, and are then received back by the ultrasound sensor. The filling level in the container in which the liquid is present can be ascertained from the recorded travel-time of the sound waves. However, when the engine is running, in particular in a motor vehicle, it is very difficult if not to say impossible to ascertain the filling level of the oil, because the oil is all frothed up with the sound waves reflecting off the gas bubbles in the oil. The values detected are therefore scattered across a wide range. In order to obtain measured values which can be used for evaluation, an unequivocal boundary surface between the media, i.e. gas and oil, is needed. In order to achieve this, the ultrasound sensors are associated with so-called damping cups. Within these damping cups which envelope the measuring section of the ultrasound sensor, the liquid to be measured is calmed and connected with the container only via a small opening in the damping cup which leads into the container. The small opening in the damping cup leading to the container admits fewer gas bubbles into the damping cup. The filling level in the damping cup corresponds to the liquid level outside the damping cup, but it delays fluctuations which are generated for example when the car accelerates or when it drives through bends. In the publications EP 2366984 B1 and WO 2008/009277 A1 the damping cup is associated with pre-volumes or antechambers. These pre-volumes are provided for the purpose of degassing the liquid to be measured such as frothed-up oil, with the effect that the liquid entering the measuring section of the damping cup is relatively free of bubbles. The antechamber has deflecting elements arranged in it, which influence the flow of the liquid in the antechamber. The intention is to achieve a comparatively slow flow with the result that the liquid remains in the antechamber for a comparatively long time giving the gas bubbles time to gas out.

SUMMARY OF THE INVENTION

The invention is based on the requirement to propose a device of the kind mentioned in the beginning, which optimally utilises the available space, allowing it to be reduced to a particularly small size.

The solution to the requirement is seen in a device with the characteristics of patent claim 1. Advantageous further developments of the invention are described in the subclaims.

With a device for measuring a filling level in a container with an ultrasound sensor, wherein the ultrasound sensor is associated with a damping cup with at least one antechamber, wherein the antechamber comprises at least one outer ring and one inner ring, wherein the inner ring is arranged within the outer ring, provision is made according to the invention for the inner ring and the outer ring to be connected via at least one vertical slot, which extends over at least 50% of the height of the inner ring. In this way a particularly good connection is created between the inner ring and the outer ring allowing a particularly reliable liquid exchange to take place here. Nevertheless, the given structure of the inner and the outer ring will ensure that the dwell time of the oil in the structures of the antechamber is comparatively long thereby allowing the liquid, in particular the oil, to outgas in the antechamber.

The slot is configured such that in particular the upper end area of the inner ring is also covered by the slot, so that the slot, at the same time, establishes a venting connection from the inner ring to the outer ring. In principle it is possible for the slot to be interrupted or not to extend along the whole height. Preferably however, the vertical slot extends uninterruptedly along the whole height of the inner ring. This will ensure a satisfactory exchange of liquid between the rings, in particular it provides a continuous structure through which the liquid can flow. Preferably the antechamber comprises an inflow into the outer ring. The width of the slot roughly corresponds to the width of the inflow, i.e. the slot has the width of between a third and three times the width of the inflow. Preferably the width of the slot is between half the width of the inflow and twice the width of the inflow. Equally or alternatively the width of the slot corresponds to the width of the inflow into the measuring section. Again the band widths are between one third of the width of the inflow into the measuring section and up to three times the width of the inflow into the measuring section. Preferably these are between 0.75 times and 1.5 times the width of the inflow into the measuring section.

With a particularly preferred embodiment the damping cup is configured in such a way that the ceiling of the inner ring comprises different heights and has a lowest point and a highest point, that the inner ring in the area of the ceiling comprises a venting connection with the outer ring, that the venting connection between the inner ring and the outer ring is located at the highest point of the inner ring, that the ceiling of the outer ring comprises different heights and has a lowest point and a highest point, and that a vent hole is provided at the highest point of the outer ring. The venting connection described here between the inner ring and the outer ring is preferably realised here by the slot according to the invention between the inner ring and the outer ring. It is also possible to arrange the slot separately from the venting connection, preferably below the venting connection.

A device of this kind comprises a simple pre-volume structure which increases the degree of efficiency of the device. A particularly good calming and outgassing effect can be achieved for the same size of antechamber. The simple and symmetrical structure without dead volume ensures a very high degree of efficiency. Due to the simple symmetrical construction the venting structure will fit into a very small space.

Preferably the venting connection and the vent hole are arranged offset by 180°. In this way it is possible to realise a relatively long path of the liquid through the antechamber, and at the same time, to ensure reliable venting.

With another preferred development of the invention the pre-volume comprises an inflow into the outer ring. With this arrangement the vent hole of the outer ring is arranged vertically above the inflow. This allows gas bubbles entering through the inflow to rise directly to the top and to be discharged directly through the vent hole without progressing any further, or for a longer period, in the antechamber. In a similar way the pre-volume comprises an inflow from the outer ring into the inner ring, and the venting connection in the inner and the outer ring is arranged vertically above this inflow. This allows any gas bubbles still present to rise to the top, from where they get directly into the venting connection. From there they find their way to the vent hole and thus to the outside.

Further inflows from outside, i.e. from the container into the outer ring may be additionally provided. In a preferred development two inflows into the outer ring arranged opposite each other are provided. Furthermore two inflows from the outer ring into the inner ring may then be preferably provided. These are preferably offset by 180° relative to each other and by 90° relative to the inflows from outside into the outer ring. In consequence two inflows opposite each other from the inner ring into the measuring section are then present. These lie opposite each other, i.e. they are arranged offset by 180° and offset by 90° relative to the inflows from the outer ring into the inner ring. The inflows into the measuring section are thus aligned in the same direction as the inflows from outside into the outer ring. In principle further variations with three, four or more rings are also possible.

In another preferred development of the invention the height of the ceiling of the inner ring is configured steadily rising from the lowest point to the highest point. This means, in particular, that an air bubble can rise steadily along the ceiling to the top and the vent hole because there are no obstructions or lower-lying sections in the path to it, which could delay the rise of an air bubble. In the same way the height of the ceiling of the outer ring is configured preferably steadily rising from the lowest point to the highest point. The rise is configured steadily rising away from the measuring chamber, i.e. from inside to outside, so that foam and air are guided in direction of the vent hole.

In particular the ceiling of the inner ring describes an area which is inclined relative to the horizontal plane. A geometry of this kind can be particularly easily realised. The geometry is essentially comparable to an oblique section through a cylinder. The upper cutting edge then forms the ceiling of the ring. Slight flattenings or deviations are possible, in particular in the area of the venting connection and the vent hole. Similarly the ceiling of the outer ring essentially describes an area which is inclined relative to the horizontal plane. Especially preferably the plane describing the ceiling of the inner ring and the plane describing the ceiling of the outer ring are inclined relative to an imaginary horizontal plane between the two in exactly the opposite direction. Due to the mirror-symmetrical configuration and the possibility for the liquid to flow in both directions, the height of the building space is halved. Most preferably the lowest point of the inner ring is arranged adjacent to the highest point of the outer ring when seen in a top view. Preferably the venting connection exists between the highest point of the inner ring and the lowest point of the outer ring. This is the point where the slot is preferably arranged. Preferably this lies exactly opposite to the lowest point of the inner ring and the highest point of the outer ring.

Furthermore the invention relates to an engine, in particular a motor vehicle engine or a motor vehicle, which respectively are characterised in that they comprise an above-mentioned device.

BRIEF DESCRIPTION OF THE DRAWINGS

The invention will now be explained in detail by way of a preferred embodiment depicted in the drawing. In detail the schematic representations are as follows.

DETAILED DESCRIPTION OF THE PREFERRED EMBODIMENTS

Figure 1:
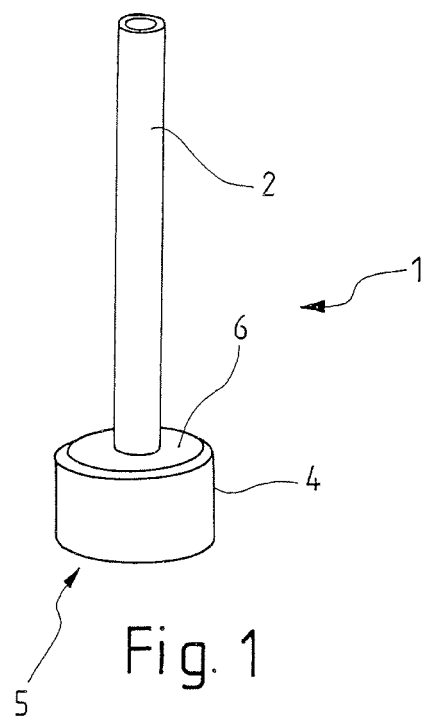
FIG. 1 shows a perspective view of a device for measuring the filling level in a container with an ultrasound sensor and a damping cup.

FIG. 1 shows a damping cup 1 which comprises a pipe 2 in the upper area, through the inside of which a measuring section extends, and which comprises a pre-volume 5 in the lower area. This lower area is essentially composed of an outer wall 4 and a lid 6 and a bottom. At the bottom of the measuring section 3 extending through the pipe 2 an ultrasound sensor is arranged, which emits ultrasound waves, which flow in the measuring section 3 and which are reflected at the boundary surface of the liquid to be measured, in particular oil, with the medium above it, in particular air, and which then flow back to the ultrasound sensor. The filling level can then be calculated based on the travel-time of the signal.

Figure 2:
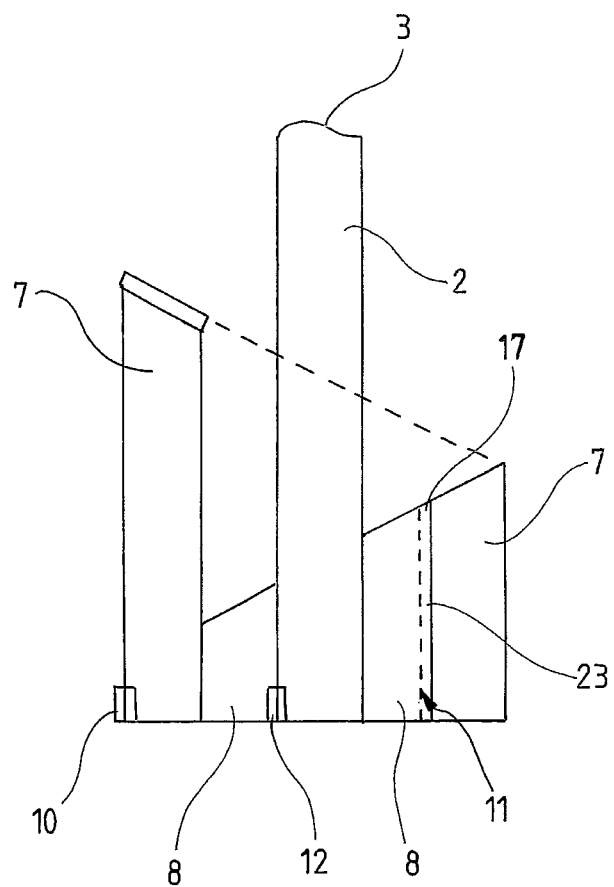
FIG. 2 shows a sectional view through a device according to the invention.

FIG. 2 represents a cross-section through the damping cup 1. The measuring section 3, at the bottom of which the ultrasound sensor not shown is arranged, extends through the pipe 2. The pre-volume 5 here consists of an inner ring 8 and an outer ring 7. These are formed of the outer wall 4 and an inner wall 9. The view according to FIG. 2 reveals an inflow 10 for the entrance of liquid from the container into the antechamber 5. This inflow initially leads into the outer ring 7. The inflow 10 is essentially a breakthrough through the outer wall 4. The inflow is arranged close to the bottom, in particular directly adjacent to the bottom of the damping cup 1. The liquid can then enter through an inflow 11 from the outer ring 7 into the inner ring 8. The inflow 11 is offset by at least 90°, preferably 180° as shown here, relative to the inflow 10. From the inner ring 8 the liquid can then, through an inflow 12, reach the measuring section 3. The inflow into the measuring section 3 is offset by at least 90°, but preferably 180° as shown here, relative to the inflow 11. By arranging the inflows 10, 11 and 12 in this way, it is ensured that the path along which the liquid travels through the antechamber is a very long one, which has the effect of calming the liquid and allowing it to outgas, thereby reducing the air bubbles in it, from which the ultrasound waves could be reflected and thereby interfere with the measuring result, to a minimum. In the right-hand area it can be seen that here the inflow 11 into the inner ring and the venting connection 17 are connected with each other by a continuous slot 23. This continuous slot 23 connects the inner ring 8 and the outer ring 7. This slot 23 is thereby arranged opposite the inflow 10 into the outer ring. The lines drawn in the figure also highlight the steadily rising configuration of the ceiling of the inner ring 8 and the outer ring 7. This ensures that gas bubbles outgassed in the antechamber 5 can glide along the ceiling of the respective chamber and finally exit through a vent hole in the highest possible position, of the outer ring 7.

Figure 3:
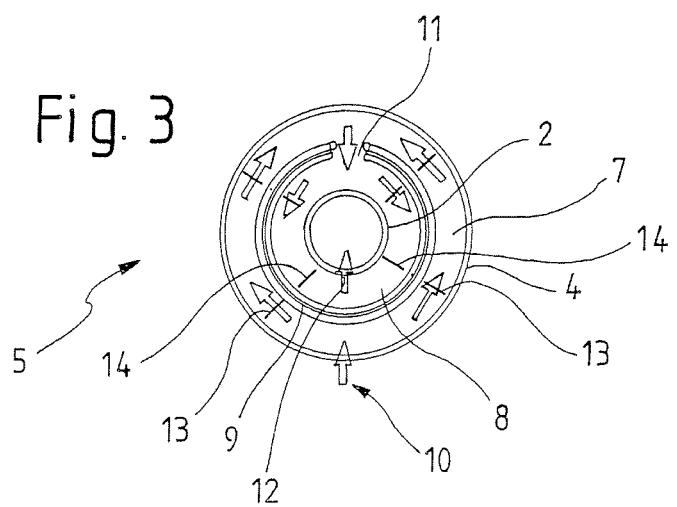
FIG. 3 shows a cross-section through the pre-volume of the device according to the invention.

FIG. 3 shows a cross-section through the antechamber 5. Identical parts have been marked with the same reference symbols. The antechamber 5 is essentially formed by the outer wall 4 and the inner wall 9 which here surround the pipe 2 as concentric circles. The outer wall 4 comprises the inflow 10, through which the liquid enters from the container into the damping cup, in particular the pre-volume 5 of the damping cup, in particular the pre-volume 5 of the damping cup. The liquid then flows through the outer ring 7 to the inflow 11 arranged offset by 180° relative to the inflow 10, and then through the inflow 11 from the outer ring 7 into the inner ring 8. Once in the inner ring the liquid flows to the inflow 12 through which the liquid, from the inner ring 8, reaches the measuring section 3. In order to generate a particularly favourable flow at this point, two deflecting elements 13 have been arranged in the outer ring 7. The inner ring 8 has two deflecting elements 14 arranged in it. Each ring may comprise one, two, three or more deflecting elements. In the example shown two deflecting elements have been provided in each ring. The deflecting elements are arranged adjacently to the inner wall 9 in each case, so that a through-flow area remains on the outer side. With regard to the inner wall 9 the deflecting elements 13, 14 in the inner ring 8 are arranged and configured mirror-symmetrically relative to the deflecting elements 13 in the outer ring 7. The two deflecting elements arranged in one ring are arranged symmetrically to the inflow 10, each of them at an angle of 90° or less, preferably at an angle of approx. 40° to 50°.

Figure 4:
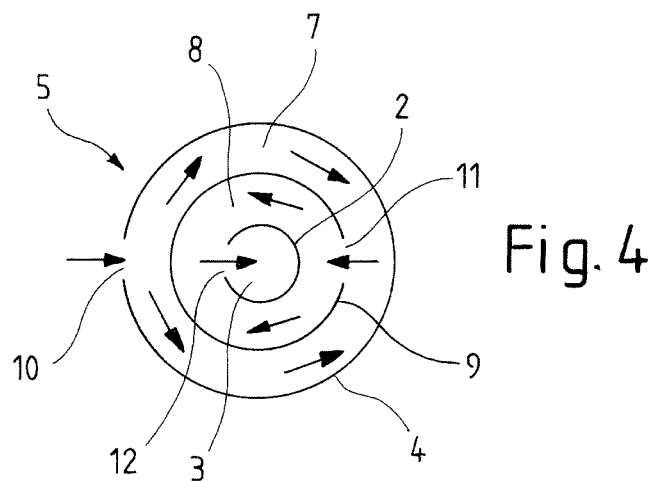
FIG. 4 shows a sectional top view of a first variant of the device according to the invention.

FIG. 4 shows a sectional top view of a first variant of the device according to the invention. The cut is taken in the area of the pre-volume 5, here in the bottom area so that the inflows arranged in the bottom area are visible. The liquid enters through the inflow 10 in the outer wall 4. The liquid then enters into the outer ring 7, flowing in arrow direction in this outer ring 7, and can then, through an inflow 11, enter from the outer ring 7 into the inner ring 8. The inflow 11 is offset by 180° relative to the inflow 10 such that a maximum travel through the outer ring 7 is necessary in order to bring the liquid into the inner ring 8. In the inner ring 8 there is an inflow 12 from the inner ring 8 into the measuring section 3. This inflow is also offset by 180° relative to the inflow 11. The inflow 11 and the inflow 12 therefore have the same alignment, but are separated by the inner wall 9 which is closed at this point.

Figure 5:
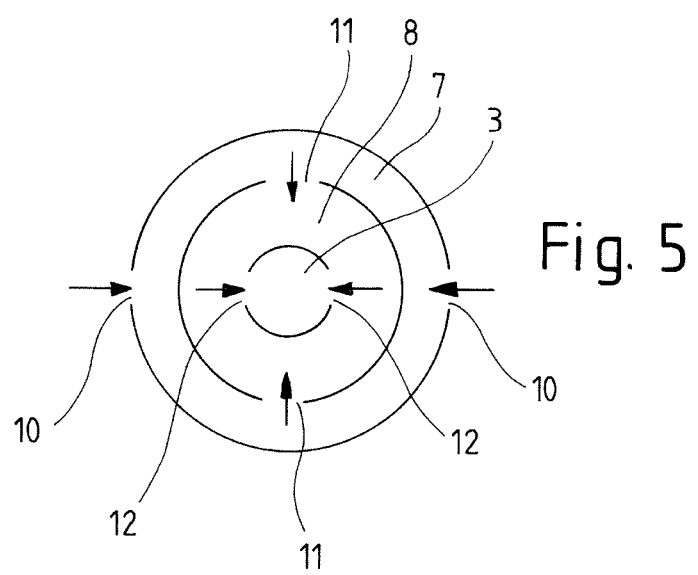
FIG. 5 shows a sectional top view of a second variant of the device according to the invention.

FIG. 5 shows a second variant of a damping cup according to the invention. In most respects this is identical to the variant of FIG. 4. However, the provision here is for two inflows 10, two inflows 11 and two inflows 12. The two inflows 10 and the two inflows 12 are each arranged offset by 180° relative to each other. The inflows 11 are arranged offset by 90° relative to the inflows 10 and the inflows 12.

Figure 6:
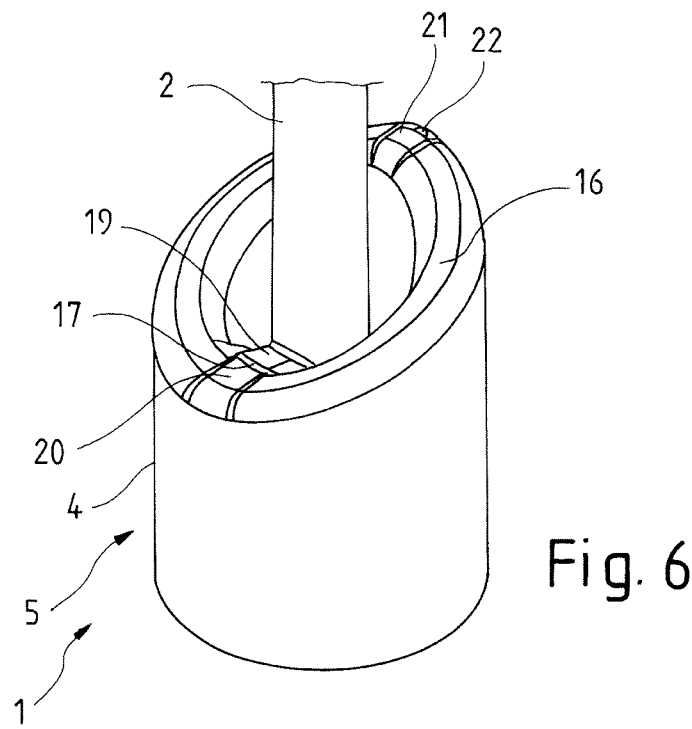
FIG. 6 shows a perspective view of the device according to the invention.
Figure 7:
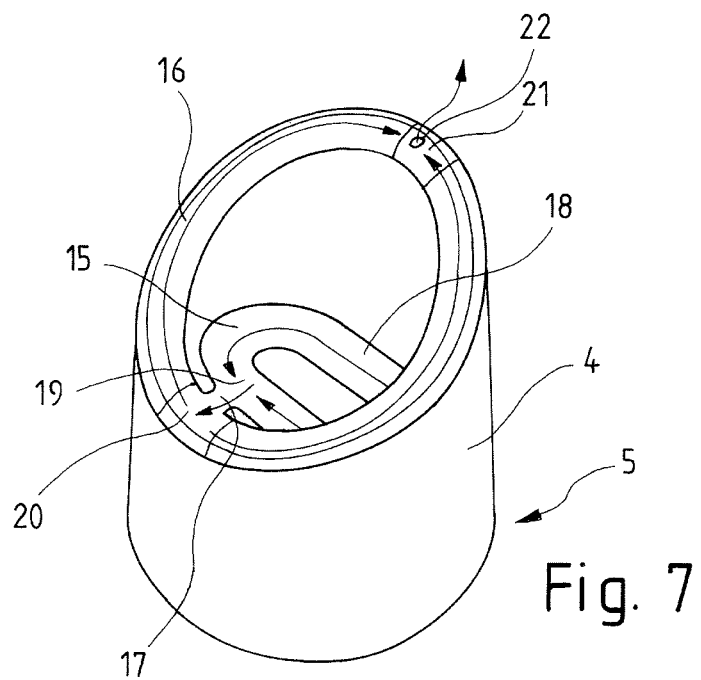
FIG. 7 shows a similar perspective view of the device according to the invention as FIG. 6, but without the pipe which forms the measuring section.

FIGS. 6 and 7 each show perspective views of the damping cup 1 with the pre-volume 5. Identical parts are marked with the same reference symbols. In FIG. 6 the pipe 2 is visible in the centre, and it contains the measuring section 3. FIG. 7 does not show this pipe 2, so that the inner ring 8 with its ceiling 15 can be more clearly seen. The antechamber comprises an outer wall 4. The upper termination of the outer ring 7 arranged directly behind the outer wall 4 is formed by a ceiling 16 of the outer ring 7. The inner ring 8 surrounding the pipe 2 is arranged within the outer ring 7. The upper termination of the inner ring 8 is formed by the ceiling 15 of the inner ring 8. The ceiling 16 of the outer ring 7 comprises different heights an in particular comprises a lowest point 20 and a highest point 21. The highest point 21 is arranged vertically above the inflow 10 not visible in this view, which inflow lies exactly below the highest point 21, but in the bottom area of the antechamber 5. In case gas bubbles occur in this area, these will rise reaching the highest point 21 and exiting through the vent hole 22 arranged there. Corresponding to FIGS. 4 and 5 the liquid initially flows through the outer ring 7 and enters the inner ring 8 through the inflows 11. The gas bubbles outgassing in the outer ring 7 rise up and are guided along the ceiling 16 of the outer ring 7 to the vent hole 22 and at this point leave the antechamber 5. This is possible because of a steady rise from each point of the ceiling 16 of the outer ring 7 to the highest point 21. Here gas bubbles exit through the vent hole 22. Any gas bubbles occurring in the inner ring 8 rise and travel along the ceiling 15 to its highest point 19. The ceiling 15 of the inner ring 8 is also configured steadily rising so that gas bubbles can rise up along the ceiling 15 without being caught by obstacles. At the highest point 19 of the ceiling 15 a venting connection 17 leading to the outer ring 7 is provided so that gas bubbles can enter the outer ring 7 and travel along the ceiling 16 of the outer ring 7 to the vent hole 22. The inflow 11 into the inner ring 8 is located below the venting connection 17 and the highest point 19 of the inner ring 8 so that any gas bubbles occurring there can rise up directly to this highest point 19.

Figure 8:
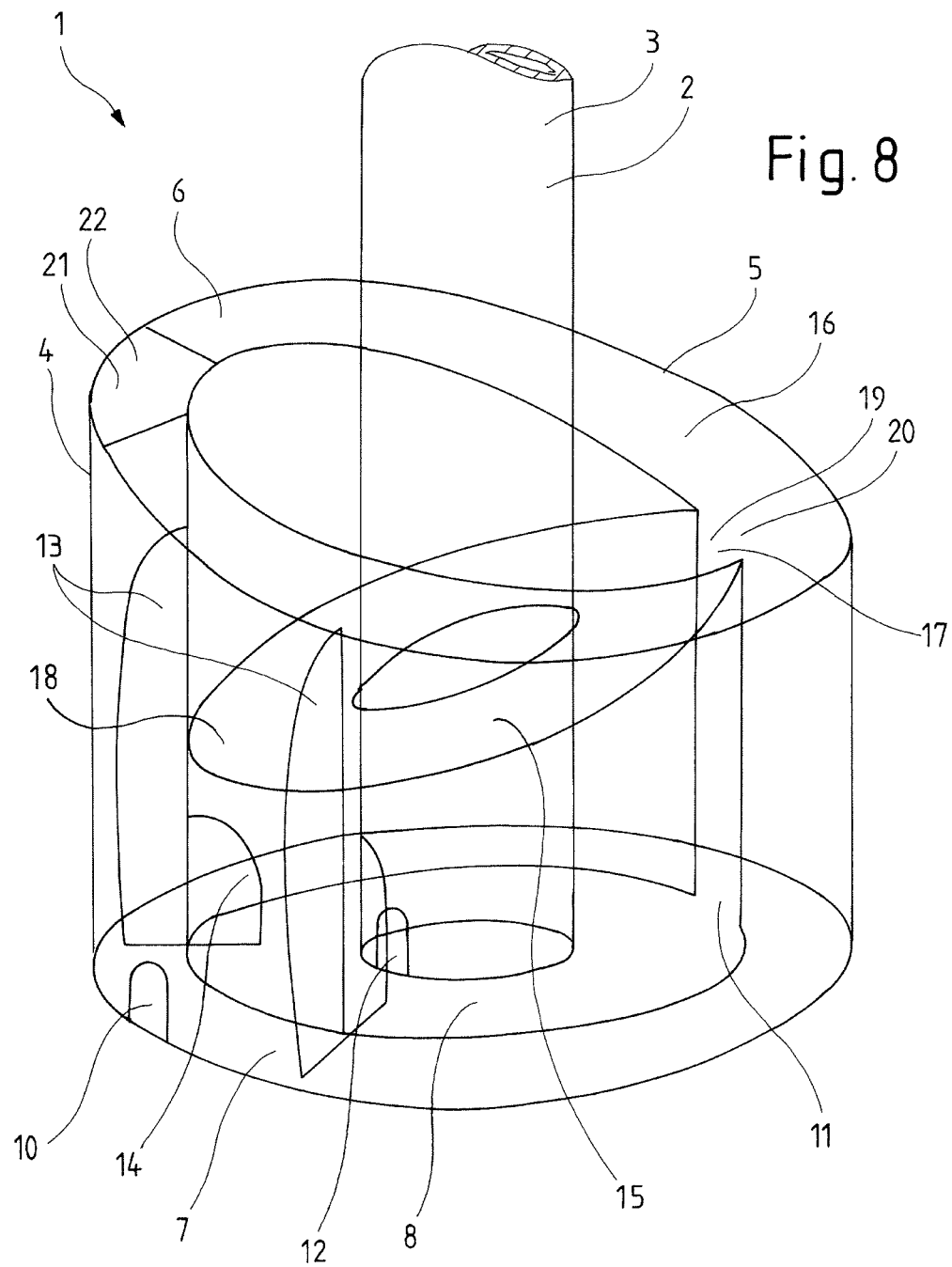
FIG. 8 shows a perspective view of a device according to the invention, where only the boundary lines are shown so that the inner ring is visible as well.

FIG. 8 shows a perspective view of the damping cup 1 with the measuring section 3, wherein the damping cup 1 is formed here of the inner ring 8 and the outer ring 7. Only the lines are drawn in this figure so that the outer ring 7 and the inner ring 8 and also the measuring section 3 are visible. From the device or the container in which the oil is held and in which the device is located, oil enters through the inflow 10 into the outer ring 7. The outer ring 7 here has deflecting elements 13 arranged in it on both sides of the inflow 10. These extend over approx. 60% to 90% of the height of the outer ring 7. In the lower part these deflecting elements are particularly wide but are reducing in width in upward direction so that the flow becomes more uniform further up thus making optimal use of the constructional space for the damping cup 1, in particular the outer ring 7. From the inflow 10 the oil or the liquid spreads symmetrically to both sides of the outer ring 7 and also around it and can then flow out on the opposite side through the slot 23 which at this point extends over the entire height of the inner ring 8 and the outer ring 7 and thereby typically extends from the bottom inflow 11 into the inner ring as far as the venting connection 17 at the upper end of the inner ring 8 or, in other words, replaces these two elements. The liquid then flows in the inner ring 8. Here again deflecting elements 14 are arranged. These are arranged exactly opposite the deflecting elements 13 and on both sides of the inflow 12 into the measuring section 3. The height of the deflecting elements 14 again corresponds to a height of approx. 50% to 80% of the height of the inner ring 8 at the point where the deflecting elements 14 are arranged. The ceiling 15 of the inner ring 8 is inclined relative to a horizontal. Similarly the ceiling 16 of the outer ring 7 is inclined relative to a horizontal. The ceilings 15 and 16 meet at the highest point 19 of the inner ring 8 or the lowest point 20 of the outer ring 7. The lowest point of the ceiling 15 is indicated by 18.

Figure 9:
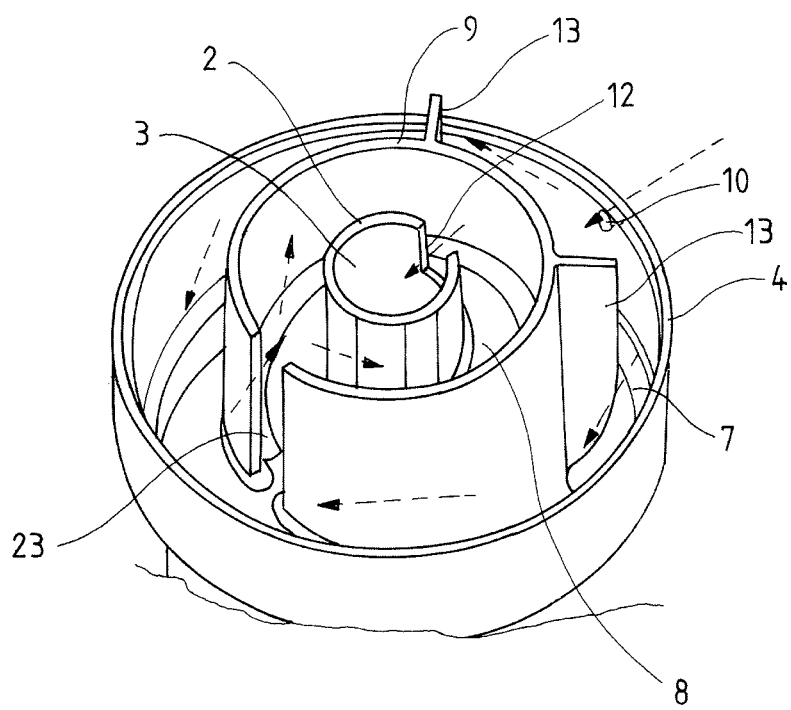
FIG. 9 shows a view of a device according to the invention from below, but without the floor area and the ultrasound sensor, so that the structure of the damping cup is visible.

FIG. 9 shows a perspective view of the damping cup 1 from below. Here arrows indicate the flow of the liquid through the inflow 10 into the outer ring 7. The liquid flows past the deflecting elements 13 which here again are at their widest in the bottom area and become narrower as they rise upwards. The outer contour is shaped as a parable or an ellipse. After flowing around the inner wall 9 separating the outer ring 7 from the inner ring 8, the oil or the liquid flows through the slot 23 into the inner ring 8, then through the pipe 2 at this point and finally through the inflow 12 into the measuring section 3.

All features cited in the above description and the claims can be combined ad lib with the features of the independent claim. The disclosure of the invention is thus not limited by the feature combinations described or claimed, rather all feature combinations meaningful in terms of the invention are considered as being disclosed.

The invention claimed is:

1. A device for measuring the filling level of a liquid in a container with an ultrasound sensor, wherein the ultrasound sensor is associated with a damping cup with at least one antechamber, wherein the antechamber comprises: at least one outer ring and one inner ring, wherein the inner ring is arranged within the outer ring, and wherein the inner ring and the outer ring are connected via at least one vertical slot, which extends over at least 50% of the height of the inner ring;

wherein the ceiling of the inner ring comprises different heights including a lowest point and a highest point, the inner ring, in the area of the ceiling, comprises a venting connection with the outer ring, the venting connection between the inner ring and the outer ring is at the highest point of the inner ring, the ceiling of the outer ring comprises different heights including a lowest point and a highest point, and a vent hole is provided at the highest point of the outer ring.

2. The device according to claim 1, wherein the venting connection and the vent hole are arranged offset by 180° relative to each other.

3. The device according to claim 1, wherein the antechamber comprises a first inflow into the outer ring and a vent hole of the outer ring is arranged vertically above the first inflow.

4. The device according to claim 1, wherein the height of the ceiling of the inner ring is configured so as to rise steadily from the lowest point to the highest point.

5. The device according to claim 1, wherein the height of the ceiling of the outer ring is configured so as to rise steadily from the lowest point to the highest point.

6. The device according to claim 1, wherein the ceiling of the inner ring essentially describes a plane which extends at an angle to the horizontal plane, in that the ceiling of the outer ring essentially describes a plane which extends at an angle to the horizontal plane and in that the plane described by the ceiling of the inner ring and the plane described by the ceiling of the outer ring are mirror-symmetrically aligned with a horizontal plane.

7. The device according to claim 1, wherein the ceiling of the inner ring and the ceiling of the outer ring are inclined at an angle between 20° and 30° relative to the horizontal.

* * * * *